United States Patent

[11] 3,540,452

| [72] | Inventors | Francis Cowgill Usher, Houston, and Ralph Rolland Langner, Lake Jackson, Texas |
|------|-----------|---|
| [21] | Appl. No. | 709,006 |
| [22] | Filed | Feb. 28, 1968 |
| [45] | Patented | Nov. 17, 1970 |
| [73] | Assignee | The Dow Chemical Company Midland, Michigan a corporation of Delaware |

[54] SUTURE
17 Claims, 5 Drawing Figs.

[52] U.S. Cl. .................................................. 128/335.5, 117/161, 161/176
[51] Int. Cl. .................................................. A61l 17/00
[50] Field of Search .................................... 128/335.5; 161/175, 176; 117/161

[56] References Cited
UNITED STATES PATENTS

| 2,193,188 | 3/1940 | Bradley | 128/335.5 |
|---|---|---|---|
| 2,734,506 | 2/1956 | Nichols et al. | 128/335.5 |
| 3,105,493 | 10/1963 | Usher | 128/335.5 |
| 3,125,095 | 3/1964 | Kaufman et al. | 128/335.5 |
| 3,187,752 | 6/1965 | Glick | 128/335.5 |
| 3,228,790 | 1/1966 | Sexsmith et al. | 117/138.8 |
| 3,239,370 | 3/1966 | Thomson et al. | 117/138.8 |
| 3,259,688 | 7/1966 | Towne et al. | 174/107 |
| 3,423,231 | 1/1969 | Lutzmann | 117/68.5 |

*Primary Examiner*—Dalton L. Truluck
*Attorneys*—Griswold and Burdick, Lester J. Dankert and Ralph M. Mellom ABSTRACT: A suture having a strongly adherent plastic coating of a copolymer of an olefin and an $\alpha,\beta$-monoethylenically unsaturated carboxylic acid or anhydride is prepared by depositing a coating of the copolymer on a suitable substrate. In an alternate embodiment, an overcoating of a suitable organic plastic material is deposited on the copolymer coating such that the copolymer serves as an adhesive interlayer between the substrate and the organic plastic overcoat. The plastic coatings can be applied by any suitable technique such as dip coating in a fluidized bed, solution deposition, extrusion coating, and the like.

Patented Nov. 17, 1970

3,540,452

INVENTORS.
Francis C. Usher
BY Ralph R. Langner

Ralph M. Mellom
ATTORNEY

SUTURE

This invention relates to sutures. In one aspect, this invention relates to improved surgical sutures for joining together the edges of a wound or incision as by stitching or the like. In another aspect, this invention relates to sutures having a coating of an organic plastic material.

The suture art is replete with different but often closely related designs or types of suture structures which are fashioned from a variety of different materials. One such suture design is in the form of a woven or otherwise interlocked structure assembled from a single filament or from a group of filaments made of an organic polymeric material. Another rather popular suture structure is one having a monofilament substrate coated with a polyolefin such as polyethylene. As a general proposition, the use of an organic plastic material such as a polyolefin either as a coating to produce a coated suture or as a material from which the entire suture is fabricated have not met with complete success because of the limitations of some of the properties of the organic plastic materials. Attempts to treat the organic plastics to improve certain properties often produce deleterious effects on other properties. For example, orientation of certain polyolefin sutures to improve tensile strength quite often produces a suture too prone to kinking to be useful. In general, organic plastic materials heretofore employed in the suture art are deficient in tensile strength, knot retention, handling qualities, resistance to kinking, and the like.

Insofar as the coated suture structure is concerned, the absence of a suitable bond between the substrate or the core of the suture and the plastic coating has limited their acceptance. A strong and lasting bond between the substrate or core and the outer plastic coating is essential to achieve good knotting properties, i.e. knot retention, ease of tying, etc. and to prevent capillary transmission of infectious fluids between the core and the outer plastic coating. Regarding the knot retention capabilities, it is evident that the holding power imparted by a knot will be lost when the knot slips such as will occur when the outer coating moves relative to the core. Regarding the transmission of fluids along the length of the suture, unless a strong and lasting bond exists between the substrate and the outer coating the deleterious side effects resulting from the transmission of infectious fluids throughout a sutured opening far outweigh the advantages gained by employing a suture of this type.

According to this invention, these and other disadvantages of the prior art sutures are overcome by means of a suture comprising a core or substrate having a strongly adherent coating of a copolymer of a monoolefin and an $\alpha,\beta$-monoethylenically unsaturated carboxylic acid. The monoolefin in the copolymer has between 2 and 6 carbon atoms per molecule, inclusive. The $\alpha,\beta$-monoethylenically unsaturated carboxylic acid in the copolymer has between 3 and 8 carbon atoms per molecule, inclusive.

The sutures of this invention have excellent knot retention properties, high tensile strength to diameter ratios, good handling characteristics, low tendency to kinking, and low tendency to transmit infection by capillary action. These advantages are realized in accordance with this invention by the particular type of suture structure and by providing a strongly adherent coating on the core or substrate.

Accordingly, it is an object of this invention to provide a suture having a strongly adherent coating which will not slip or move relative to the center or core of the suture.

Another object of this invention is to provide a suture having a high ratio of tensile strength to diameter.

A further object of this invention is to provide a suture having good handling characteristics with a reduced tendency to kinking.

Yet another object of this invention is to provide a suture having good knot retention properties.

A still further object of this invention is to prevent the spread of infection throughout a sutured opening such as a wound or an incision.

These and other objects of the invention will become apparent to one skilled in the art after studying the following detailed description, the appended claims, and the accompanying drawing wherein:

Figure 1:
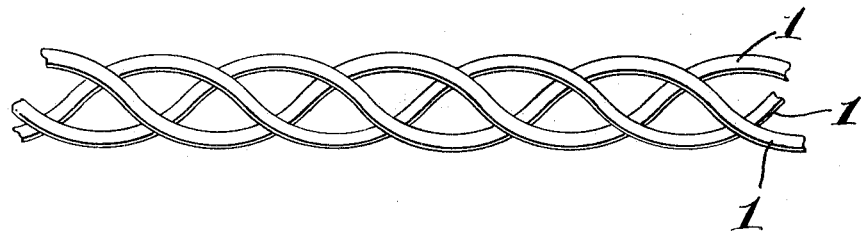
FIG. 1 is an illustration of a suture structure wherein a plurality of coated substrates are twisted together to form a twisted multifilamentary suture structure.
Figure 2:
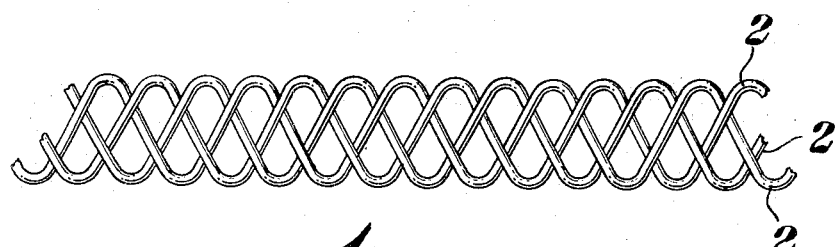
FIG. 2 is an illustration of a suture structure wherein a plurality of coated substrates are braided together to form a braided multifilamentary suture structure.
Figure 3:
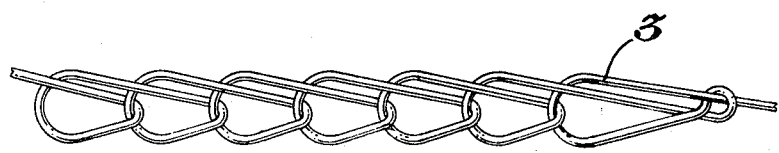
FIG. 3 is an illustration of a coated substrate crocheted to produce a suture structure having a series of interlocked loops.

In FIGS. 1 through 3, the sutures are illustrated with the several loops being loosely formed for the sake of clarity. The loops in the sutures are drawn tight when the sutures are used. Although the sutures illustrated in FIGS. 1 and 2 each show three monofilaments twisted or braided together, respectively, it is within the spirit and scope of the invention to employ any suitable number of monofilaments to fashion sutures of this type. It is also noted that the sutures illustrated in the drawing are not necessarily drawn to scale or in relative proportion as to size or shape.

The sutures of this invention comprise a core and a strongly adherent coating on the core of a copolymer of a monoolefin having between 2 and 6 carbon atoms per molecule, inclusive, and an $\alpha,\beta$-monoethylenically unsaturated carboxylic acid having between 3 and 8 carbon atoms per molecule inclusive. The core of the suture serves as a substrate for the copolymer coating and can be either metallic or nonmetallic. In a modification of the invention, the suture has an outer coating of an organic plastic material strongly adhered to the copolymer coating. In this form of the invention, the copolymer coating serves as an interlayer between the core or substrate and the outer coating.

The olefin-acid copolymers contemplated for use as the strongly adherent coating on the sutures of this invention include both the random copolymers and the graft copolymers. These copolymers can be obtained commercially or they can be prepared by a variety of suitable techniques well known in the polymerization art. While the invention is not to be limited or bound by any particular technique for preparing the copolymers, suitable methods for preparing graft copolymers which can be used in the practice of this invention are outlined in U.S. Pat. Nos. 3,177,269 and 3,270,090, the disclosures of which are specifically incorporated herein by reference. An exemplary technique for producing the random copolymers involves subjecting a mixture of a suitable olefin and a suitable acid to a high pressure such as between about 500 and about 1,000 atmospheres and to an elevated temperature such as between about 100° and about 400°C in the presence of a suitable free radical initiator such as lauroyl peroxide, ditertiary butyl peroxide, or $\alpha,\alpha$-azobisdiisobutyronitrile. Polymerization conditions can be varied to produce random copolymers having the desirable molecular weight. In general, molecular weights within the range of between about 600 and about 100,000 can be produced.

In either the random or the graft copolymers suitable for use in fabricating the sutures of this invention, it is generally preferred that the copolymer contain between about 80 and about 99.5 percent by weight combined olefin and between about 0.5 and about 20 percent by weight combined acid. While these ranges are generally preferred primarily from the standpoint of economics, it is to be understood that copolymers having the components outside of these ranges can be used if desired without departing from the spirit or scope of the invention.

As a general proposition, monoolefins having between 2 and 6 carbon atoms per molecule, inclusive, can be employed in preparing the copolymers which are subsequently used in fabricating the sutures of this invention. Exemplary monoolefins within this class include ethylene, propylene, 1-butene, 1-pentene, 2-pentene, 1-hexene, 3-hexene, 3-methylbutene-1, 4-methylpentene-1, and the like. Copolymers employing ethylene as the olefin are generally preferred from the standpoint of economics and because of the ease with which it will react with an acid or with which a homopolymer of it will serve as a base or trunk to which the acid can be grafted.

Any $\alpha,\beta$-monoethylenically unsaturated carboxylic acid having between 3 and 8 carbon atoms per molecule, inclusive, which is copolymerizable with an olefin of the class described or which is suitable for grafting onto a homopolymer of an olefin of the class described can be used to prepare a copolymer coating useful for fabricating the sutures of this invention. Exemplary acids including monocarboxylic acids and polycarboxylic acids within this class include acrylic, methacrylic, ethacrylic, crotonic, isocrotonic, tiglic, angelic, senecioic, fumaric, maleic, itaconic, citraconic, and the like. The term used to describe the acid portion of the copolymer coatings of this invention is intended to include suitable $\alpha,\beta$-monoethylenically unsaturated anhydrides of carboxylic acids such as maleic anhydride. Although maleic anhydride is not a carboxylic acid because it does not have a hydrogen attached to the carboxyl groups, it is considered to be an acid for the purpose of this invention because its chemical reactivity is that of an acid. The acid portion of the copolymer is also intended to include monoesters of the polycarboxylic acids such as methyl hydrogen maleate, methyl hydrogen fumarate, ethyl hydrogen fumarate, and the like.

In that embodiment of the invention wherein an outer coating of an organic plastic material is strongly adhered to the copolymer coating, any suitable organic plastic material can be used for this purpose. Exemplary organic plastic materials include polyolefins such as polyethylene, polypropylene, polybutene, and the like; polyacrylates such as polymethacrylate, polyethacrylate, and the like; polyamides, such as Nylon 66 and the like; polyesters such as poly(ethylene terephthalate); polyethers; polyurethanes; polyvinyls, and the like. From the standpoint of economics and availability, polyethylene is generally preferred as the overcoating on the sutures of the invention.

The core which serves as a substrate for the strongly adherent copolymer coating can be fashioned from any suitable metallic material such as stainless steel, titanium, alloys of titanium, magnesium, alloys of magnesium, lead, alloys of lead, and the like. Stainless steel is generally preferred as a core material because of its good tensile strength.

The cores of the sutures of this invention can also be formed of a suitable nonmetallic material such as but not limited to silk; fiberglass; polyolefins such as polyethylene, polybutenes, polyhexenes, and the like; polyacrylates such as polymethacrylate, polyethacrylate, and the like; polyamides such as Nylon 66 and the like; polyesters such as polyethylene terephthalate; polyethers; polyurethanes; polyvinyls; and the like. While any one of the foregoing nonmetallic materials may possess certain advantages under given conditions, polyolefins are generally preferred.

Referring now the the drawing, the invention will be described in more detail. It is to be understood that the sutures illustrated are intended to be representative only and that sutures embodying the features of the invention can assume many different forms.

In FIG. 1, a plurality of individual sutures 1 are twisted together to form a twisted multifilamentary suture structure. The individual sutures comprise a core of a suitable metallic or nonmetallic material and a strongly adherent copolymer coating of the type herein defined. The twisted multifilamentary suture structure is illustrated as being loosely formed for the purpose of showing the relationship between the individual sutures 1. While this suture structure is illustrated as being made up of three individual sutures or strands, this suture structure can be formed of any number of strands such as up to 100 or more.

As shown in FIG. 2, a plurality of individual sutures or strands 2 are braided together to form a braided multifilamentary suture structure. In this embodiment of the invention, the individual sutures or strands 2 comprise a suitable metallic or nonmetallic core and a strongly adherent copolymer coating of the type herein defined. Although the braided suture structure of this embodiment is illustrated as being formed from three individual sutures or strands loosely formed, it is evident that any suitable number of individual sutures or strands such as up to about 100 or more can be braided together and drawn tight to form a structure characterized by the repeating oblique sections.

In FIG. 3, the suture 3 is crocheted to produce a suture structure characterized by a series of interlocked loops, each of which is interlocked in the preceding loop. The individual suture 3 used to form the crocheted suture comprises a suitable metallic or nonmetallic core and a strongly adherent copolymer coating of the class herein defined. While the loops in the crocheted suture structure are illustrated as being loosely formed, they are drawn tight when the suture is used.

Figure 4:
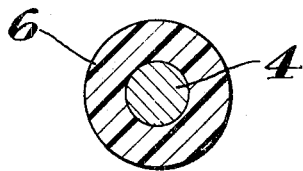
FIG. 4 is a cross section of a monofilament suture illustrating a strongly adherent copolymer coating on a substrate.

FIG. 4 of the drawing illustrates a suture cross section having a monofilament core 4 and a strongly adherent copolymer coating 6 on the core. Sutures having this structure can be used as such or, as indicated with respect to the description of FIGS. 1 through 3, they can be twisted, braided, or crocheted to produce a multifilamentary or looped suture structure as desired.

Figure 5:
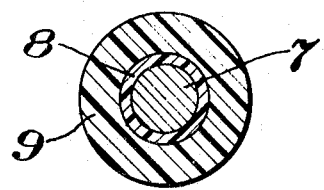
FIG. 5 is a cross section of a monofilament suture comprising a substrate, a copolymer coating, and an outer coating strongly adhered to the copolymer coating.

As shown in FIG. 5, a suture comprising a core 7 and a strongly adherent copolymer coating 8 of the class hereindescribed is provided with an outer coating 9 of a suitable organic plastic material strongly adhered to the copolymer coating 8. As previously indicated, the outer coating 9 can be any suitable plastic material such as polyethylene or the like.

A plurality of sutures having outer coating as illustrated by FIG. 5 can be twisted together to form a twisted multifilamentary suture structure as illustrated in FIG. 1 or they can be braided together to form a braided multifilamentary suture structure as illustrated in FIG. 2. Moreover, the suture illustrated by FIG. 5 can be crocheted to produce a suture structure having a series of interlocked loops.

While FIGS. 1 through 3 are illustrative of different suture structures formed from individual sutures or strands comprising a monofilament core and a copolymer coating, as previously indicated the structures shown by FIGS. 1 through 3 are also illustrative of different core structures which can be coated with the copolymer coating of the invention. Thus, the cores 4 and 7 of FIGS. 4 and 5, respectively, can be in a form other than the illustrated monofilament.

A monofilament of a suitable metallic or nonmetallic material can be crocheted to form a suture core structure having a series of interlocked loops similar to that shown in FIG. 3 in connection with the crocheted suture structure. The crocheted suture core structure is then provided with a strongly adherent copolymer coating of the class described.

In another modification of the core structure of the suture of the invention, a plurality of suitable metallic or nonmetallic monofilaments are twisted together to form a twisted suture core structure similar to that illustrated in FIG. 1 in connection with the twisted suture structure. The twisted suture core structure is then provided with a strongly adherent COPOLYMER coating of the class described.

In yet another modification of the core structure, a plurality of suitable metallic or nonmetallic monofilaments are braided together to form a braided suture core structure similar to that illustrated in FIG. 2 in connection with the braided suture. The braided suture core structure is then provided with an outer coating of a strongly adherent copolymer of the class described to form a suture structure according to another embodiment of the invention.

In another embodiment of the invention, the suture structures of FIGS. 1 through 3 comprising individual sutures or strands of a suitable metallic or nonmetallic core and a strongly adherent coating of a copolymer of the class described being drawn tight and provided with an outer coating of a suitable organic plastic material strongly adhered to the copolymer coating of the individual sutures or strands. The outer coating of organic plastic material can be the same type of coating as that described in connection with the outer coating on the individual sutures or strands which are employed as such or which are formed into the suture structures illustrated by FIGS. 1 through 3. In a modification of this embodiment, the metallic or nonmetallic cores having the copolymer coatings as shown in FIGS. 1 through 3 which are drawn tight and provided with an outer coating can be multifilamentary such as braided or twisted or the core can be a crocheted monofilament instead of a monofilament core.

Thus, the twisted multifilamentary suture of FIG. 1 is provided with an outer coating of an organic plastic material after the twisted multifilamentary structure is bound tight. Similarly, in connection with another application of this modification of the invention, the braided multifilamentary suture of FIG. 2 has an outer coating of an organic plastic material strongly adhered thereto. In a like manner, the crocheted suture structure of FIG. 3 is provided with an outer coating of an organic plastic material after the interlocked loops are drawn tight.

The invention is not to be bound or limited by the particular size or shape of the sutures whether they be in monofilament form with or without an overcoating or whether they be in multifilamentary form with or without an overcoating. In general, the invention is applicable to any size or shape core material which can be employed alone or as a component in a multifilamentary structure to produce a suitable suture. Thus, for example, sutures of a size between about 10—0 (diameter range of 0.013 to 0.025 mm.) and about 7 (diameter range of between 0.914 and 1.016 mm.) can be fabricated and used in accordance with the invention.

The thickness of the copolymer coatings on the substrate or core is likewise not intended to be limiting of the invention and can be largely a matter of personal choice and can be dictated by such factors as end use, whether or not an overcoating is used, economics, and the like. In general, copolymer coatings of between about 0.01 and about 50 or more mils can be employed. A more preferred thickness for the copolymer coating is between about 1 and about 20 mils.

When an overcoating is employed, in accordance with that modification of the invention, its thickness is likewise governed by such factors as end use, personal preference, economics, and the like. In general, the organic plastic overcoating can be between about 0.01 mils to 300 mils or more. A more preferred range for the overcoating is between about 3 and about 100 mils.

Coatings including the copolymer coating and the outer coating of an organic plastic material can be applied by a variety of suitable techniques well known in the coating art. For example, the coatings can be applied by solution deposition, dip coating in a fluidized bed, extrusion coating, and the like. The copolymer can be supplied to the appropriate coating apparatus in the form of pellets or granules. Similarly, when an outer coating is applied to the suture, it can be supplied to the appropriate outer coating apparatus in pellet or granular form.

In a typical extrusion coating process illustrative of one technique for producing the sutures of this invention, a stainless steel core or substrate in the form of a wire is passed through the cross-head die of a conventional wire coating extrusion apparatus. Pellets of a copolymer of ethylene and acrylic acid are introduced into the plastification zone of the extruder wherein they are plasticized into a melt which is forced through the annular die of the extruder and onto the stainless steel core. The resulting product is then passed through the cross-head die of a second conventional wire coating extruder wherein polyethylene pellets are plasticized and extruded onto the copolymer coating to produce a suture having a stainless steel core, a strongly adherent copolymer interlayer of ethylene and acrylic acid, and an outer coating of polyethylene. The suture can be used in its monofilament form or it can be crocheted to produce a suture structure having a series of interlocked loops. A plurality of the sutures can be twisted or braided together to produce multifilamentary suture structures.

The sutures of this invention find utility in a variety of different environments including the closing of openings such as wounds or surgical incisions in human beings, animals, mammals, and the like. In view of the high ratio of tensile strength to diameter, the sutures of this invention are particularly well suited for closing wounds under emergency conditions such as wounds encountered during combat and civil disasters. In these situations, a suture of high tensile strength which will not harbor or transmit infection, such as the sutures of this invention, are very desirable. The copolymer coating of this invention is particularly advantageous when applied to a multifilament core because the copolymer effectively binds and holds the individual filaments of the core together after the suture has been cut.

The sutures of this invention may be used with open-hole needles or they can have needles swaged on them. The sutures can be sterilized by suitable gas sterilization techniques or by suitable irradiation techniques.

The following examples will illustrate the improved results achieved by the sutures of this invention. It is to be understood that these examples are for the purpose of illustration only and must not be considered limiting of the invention.

EXAMPLE I

A suture core was prepared by twisting together seven strands of stainless steel wire each having a diameter of about 4 mils. The resulting twisted suture core had a diameter of about 12 mils. The twisted core was heated to a temperature of about 620°F. in an electrically heated tube furnace before being passed through a conventional three-fourths inch wire coating plastic extruder at a rate of about 25 feet per minute. A copolymer of 92 percent by weight combined ethylene and 8 percent by weight combined acrylic acid was fed to the extruder in the form of pellets. The extruder was adjusted to provide a copolymer coating on the suture core of about 4 mils thick. This resulted in a suture having a diameter of slightly less than 21 mils. Samples of this suture were tested for tensile strength by placing them in an Instron tensiometer. On the basis of an average of five runs, the sutures measured a tensile strength to failure of 10.3 pounds. Other samples of the suture were tied into conventional surgical knots and the resulting loops severed. The ends of the loops were placed in the Instron tensiometer to test the knot strength. On the basis of five runs, the average tensile strength to failure for the knots was measured and found to be 9.3 pounds or approximately 91 percent of the tensile strength of the straight suture. In the runs measuring both suture tensile strength and knot tensile strength it was observed that the copolymer coating broke evenly with the suture core without leaving any free or ragged ends. It was also observed that the copolymer did not creep or travel relative to the core.

Samples of the suture core without the copolymer coating were tested for tensile strength and found to have a straight pull suture strength of 8.9 pounds to failure and a knot pull strength of 8.1 pounds to failure. It can thus be seen that the copolymer coatings contribute significantly to the tensile strength of the suture.

EXAMPLE II

A suture core was prepared by braiding together eight strands of stainless steel wire each having a diameter of about 2 mils. The diameter of the resulting braided suture core was about 8 mils. This suture core was heated and coated with a copolymer of 92 percent by weight combined ethylene and 8 percent by weight combined acrylic acid in the same manner as described in Example 1. The resulting suture had a diameter of about 15 mils. The tensile strength of the suture was measured in the same manner as that described in connection with Example 1 and on the basis of five runs measuring the tensile strength of the straight suture, the tensile strength to failure was found to be 7.1 pounds. Knots were tied in other samples and the loops cut to determine the tensile strength of the knots. On the basis of five runs, the average knot tensile strength to failure was found to be 6.8 pounds.

The tensile strength of the braided core without any copolymer coating was measured and found to average 6.2 pounds to failure and 4.8 pounds knot strength to failure. It can be seen that the copolymer coating contributes significantly to the tensile strength of the suture. It was also observed that the copolymer coating maintained the integrity of the braided structure at the point of failure.

EXAMPLE III

The braided core structure of Example II was extrusion coated with the ethylene-acrylic acid copolymer to provide a suture having a diameter of about 20 mils. The tensile strength to failure for the suture and for knots formed therein was measured and found to average about 7.2 pounds straight pull strength to failure and about 6.8 pounds knot strength to failure. By comparing these results with the tensile strength of the braided core structure without any coating it can be seen that the copolymer coating contributes significantly to the tensile strength of the suture and to the knot strength.

EXAMPLE IV

A suture was prepared by extruding a copolymer of 92 percent by weight combined ethylene and 8 percent by weight combined acrylic acid on a type 316 stainless steel wire having a diameter of 2 mils. The technique outlined in Example I was employed to produce a suture having a diameter of about 4 mils including the copolymer coating. On the basis of several tests, the average straight pull tensile strength to failure was measured and found to be above 0.54 pounds and the average knot pull tensile strength to failure was found to be about 0.5 pounds.

EXAMPLE V

A suture core was prepared by twisting together a plurality of type 316 stainless steel wires to provide a twisted suture core having a diameter of about 12 mils. The twisted core was extrusion coated with the copolymer of Example I to provide a coated suture having a diameter of about 20 mils. On the basis of several tests, the average straight pull tensile strength to failure was measured and found to be about 8.92 pounds and the average knot pull strength to failure about 8.9 pounds.

In another run, a plurality of type 316 stainless steel wires were twisted together to provide a twisted suture core having a diameter of about 4 mils. This suture core was extrusion coated with the acrylic acid-ethylene copolymer according to the technique outlined in Example I to provide a coated suture having a diameter of about 12 mils. On the basis of several tests, the average straight pull tensile strength to failure and the average knot pull strength to failure were measured and found to be about 1.95 pounds each.

EXAMPLE VI

A high tensile wire developed for the aerospace industry having a diameter of about 4 mils was extrusion coated with the ethylene-acrylic acid copolymer according to the procedures of Example 1 to provide a coated suture having a diameter of about 12 mils. On the basis of several tests, the average straight pull tensile strength to failure was measured and found to be about 5.95 pounds and the knot pull tensile strength to failure about 4.29 pounds.

In another run with the same type of wire but of a diameter of about 6 mils, the extrusion coating apparatus was adjusted to provide a suture having a diameter of about 25 mils including the ethylene-acrylic acid copolymer coating. On the basis of several tests in the Instron tensiometer, the average straight pull tensile strength to failure was found to be about 13.8 pounds and the average knot pull strength to failure about 9.12 pounds.

EXAMPLE VII

A coated suture was prepared by employing a drawn braised strand (DBS) type wire of a diameter of about 9 mils. The wire was obtained from Ft. Wayne Metals, Inc., 3211 MacArthur Dr., Ft. Wayne, Ind., 46809. A more detailed description of this wire can be found by reference to a brochure entitled "Stainless Alloy Wires in Medicine" issued by Ft. Wayne Metals, Inc., the disclosure of which is specifically incorporated herein by the reference. The DBS wire was extrusion coated with the acrylic acid-ethylene copolymer according to the technique outlined in Example I to provide a suture having a diameter of about 16 mils. On the basis of several tests in the Instron tensiometer, the average straight pull tensile strength to failure was found to be about 6.7 pounds and the average knot pull strength to failure about 6.6 pounds.

In another run, the DBS wire was provided with the copolymer coating of a thickness to provide a suture having a diameter of 19.0 mils. On the basis of several tests, the average straight pull tensile strength to failure was measured and found to be about 7.2 pounds and the average knot pull tensile strength to failure about 6.8 pounds.

EXAMPLE VIII

A size 7—0 (diameter of about 2 mils) suture wire was coated with a copolymer of ethylene and acrylic acid according to the procedure outlined in Example I to provide a resulting product having a diameter of about 4 mils. This resulting product was then passed to another extrusion apparatus and provided with an outer coating of polyethylene to provide a suture having a final diameter of about 6 mils. On the basis of several tests, the average straight pull tensile strength to failure was measured and found to be about 0.45 pounds and the average knot strength to failure about 0.42 pounds.

EXAMPLE IX

In order to evaluate the operability and acceptance of the copolymer coated wire a suture material, several coated wires were prepared and evaluated by experienced surgeons. In general, the surgeons reported that the knots held very well and that the copolymer coated suture wire did not cut the surrounding tissue as did uncoated wire. The surgeons also reported that the copolymer coated wire handled in a manner similar to that of nonmetallic sutures and that the presence of the metallic core did not effect the handling characteristics. The surgeons also noted that the copolymer coating strongly adhered to the wire core without slippage.

EXAMPLE X

A suture is prepared by passing a filament of polypropylene of a diameter of about 10 mils through a bath containing a copolymer of 92 percent by weight combined ethylene and 8 percent by weight combined acrylic acid in a solvent solution of toluene and tetrahydrofuran. The residence time, temperature, and rate of withdrawal are controlled to solution deposit the copolymer on the polypropylene core material in a thickness to provide a coated suture having a final diameter of about 18 mils.

In one run, the suture is employed as a monofilament or a single strand for closing a wound in a dog.

In another run, the suture having the copolymer coating is passed through the second extruder of Example VIII and provided with an outer coating of polyethylene to provide a suture having a final diameter of about 46 mils. This suture is useful as is to close a wound in an animal. Another section of the suture is crocheted to produce a suture having a series of interlocked loops. A plurality of the sutures having the polyethylene outer coating are braided together to form a braided multifilamentary suture structure useful in closing wounds in animals and the like.

In another run, the suture having the polypropylene core and the copolymer coating is braided together to form a braided multifilamentary suture structure which is then extrusion coated with an outer coating of polyethylene.

In yet another run, a plurality of the sutures having the polypropylene core and the copolymer coating of the ethylene and acrylic acid are twisted together to form a twisted multifilamentary suture structure is then passed through an extrusion apparatus and provided with an outer coating of polyethylene.

Although the invention has been described in considerable detail, it must be understood that such detail is for the purpose of illustration only and is not to be considered limiting of the invention. Many variations are possible without departing from the spirit and scope of the invention.

We claim:

1. A suture having improved knot retention properties, good handling characteristics, and low tendency to transmit infection by capillary action, said suture comprising a metallic core and a strongly adherent coating on said metallic core of a copolymer of a monoolefin having between 2 and 6 carbon atoms per molecule, inclusive, and an $\alpha,\beta$-monoethylenically unsaturated carboxylic acid having between 3 and 8 carbon atoms per molecule, inclusive.

2. A suture according to claim 1 wherein said metallic core is a monofilament.

3. A suture according to claim 2 wherein said monofilament metallic core is crocheted to form a suture core structure having a series of interlocked loops.

4. A suture according to claim 1 wherein said metallic core comprises a plurality of monofilaments twisted together to form a twisted suture core structure.

5. A suture according to claim 1 wherein said metallic core comprises a plurality of monofilaments braided together to form a braided suture core structure.

6. A suture according to claim 1 wherein said metallic core is selected from the group consisting of stainless steel, titanium, alloys of titanium, magnesium, alloys of magnesium, lead, and alloys of lead.

7. A suture according to claim 1 wherein said metallic core is stainless steel.

8. A suture according to claim 1 having an outer coating of an organic plastic material strongly adhered to said copolymer coating.

9. A suture according to claim 8 wherein said outer coating is fashioned of a material selected from the group consisting of polyolefins, polyacrylates, polyamides, polyethers, polyesters, polyurethanes, and polyvinyls.

10. A suture according to claim 8 wherein said outer coating is polyethylene.

11. A suture according to claim 1 which is crocheted to produce a suture structure having a series of interlocked loops.

12. A suture according to claim 11 having an outer coating of an organic plastic material strongly adhered thereto.

13. A suture according to claim 1 wherein a plurality of said sutures are twisted together to form a twisted multifilamentary suture structure.

14. A suture according to claim 13 wherein said twisted multifilamentary suture has an outer coating of an organic plastic material strongly adhered thereto.

15. A suture according to claim 1 wherein a plurality of said sutures are braided together to form a braided multifilamentary suture structure.

16. A suture according to claim 15 wherein said braided multifilamentary suture has an outer coating of an organic plastic material strongly adhered thereto.

17. A suture according to claim 1 wherein said copolymer coating comprises between about 80 and about 99.5 percent by weight combined ethylene and between about 0.5 and about 20 percent by weight combined acrylic acid.